United States Patent [19]

Kono et al.

[11] 4,262,068
[45] Apr. 14, 1981

[54] SEALED LEAD-ACID BATTERY

[75] Inventors: Migaki Kono; Hideaki Igarashi; Kenjiro Kishimoto, all of Osaka, Japan

[73] Assignee: Yuasa Battery Company Limited, Takatsuki, Japan

[21] Appl. No.: 114,687

[22] Filed: Jan. 23, 1980

[51] Int. Cl.³ .............................................. H01M 6/04
[52] U.S. Cl. .................................... 429/204; 429/247
[58] Field of Search ............... 429/251, 252, 247, 204, 429/205, 248

[56] References Cited

U.S. PATENT DOCUMENTS

| | | | |
|---|---|---|---|
| 2,484,787 | 10/1949 | Grant | 429/252 X |
| 3,014,085 | 12/1961 | Bachman | 429/251 X |
| 3,085,126 | 4/1963 | Labino | 429/252 X |
| 3,753,784 | 8/1973 | Eisenacher | 429/253 X |
| 3,776,779 | 12/1973 | Johnson | 429/204 X |
| 3,862,861 | 1/1975 | McClelland et al. | 429/252 X |
| 4,119,772 | 10/1978 | Peters et al. | 429/204 |

Primary Examiner—Charles F. Lefevour
Attorney, Agent, or Firm—Watson, Cole, Grindle & Watson

[57] ABSTRACT

The invention involves to a maintenance-free type sealed lead-acid batteries. In such battery, a combined separator is of a double layer made by double laminating a sheet-shaped separator formed by entangling glass fibers of a diameter not larger than 1 micron as a base with glass fibers of a diameter not smaller than 5 microns or preferably of 10 to 30 microns and a porous member having a maximum pore diameter larger than of the sheet-shaped separator and the electrolyte consists of an aqueous solution of sulfuric acid in which a small amount of a viscosity increasing agent is present.

The thus formed batteries are low in the cost and are high in the gas absorbing performance and life performance.

18 Claims, 4 Drawing Figures

SEALED LEAD-ACID BATTERY

BACKGROUND OF THE INVENTION

1. Field of the Invention

This invention relates to maintenance-free sealed lead-acid batteries and more particularly to a maintenance-free type sealed lead-acid battery which is high in the gas absorbing rate, long in the life, low in the cost and high in the vibration-proofness.

2. Description of the Prior Art

There is already suggested a so-called maintenance-free sealed lead-acid battery in which water need not be added, the self-discharge is little and the electrolyte does not leak out. That is to say, in the battery of this kind, in order to prevent the water in the electrolyte from being decreased mostly by the electrolysis of water in the charging end period it is general to utilize a so-called $O_2$ cycle of re-combining generated oxygen gas by means of negative plates. Also, in order to reduce the self-discharge, a lead alloy containing no antimony or pure lead is used for the grid material. In order to eliminate the leakage of the electrolyte, the electrolyte is made nonfluid. In such sealed lead-acid battery, in order to elevate the efficiency of re-combining oxygen gas by means of negative plates (in other words, the gas absorbing rate) and the leak-proofness, the free electrolyte in the battery must be as little as possible.

There are already suggested two methods of making the electrolyte nonfluid and eliminating the free electrolyte in the battery. One of them is a method wherein the electrolyte is made colloid and is fixed. The other is a system wherein a porous member is impregnated with the electrolyte to make the electrolyte substantially nonfluid.

In using the colloidal electrolyte, generally the structure is simple but there is a defect that, as the internal resistance of the battery increases, the battery performance or particularly the discharge voltage characteristic will reduce.

On the other hand, in such system of impregnating a porous member with the electrolyte as is mentioned in U.S. Pat. No. 3,862,861, generally the characteristic as of the battery is favorable but the price is high. Such porous member as for example, a sheet-shaped separator formed by entangling glass fibers of a diameter not larger than 1 micron as a base with glass fibers of a diameter not smaller than 1 micron or particularly not smaller than 5 microns at random is so high in the active substance retaining function, electrolyte absorbing capacity and gas absorbing rate in the sealed lead-acid battery as to be optimum to the use. However, such glass fibers are so special as to be very expensive and are so low in the physical stiffness that a manufacturing process different from that of the conventional lead-acid battery must be contrived. Also the fiber diameter is so small that the elasticity, active substance pressing ability and vibration-proofness are low. Further, a battery having a separator of three layers of which the outer layers are of glass paper formed of glass fibers of a diameter not larger than 1 micron and the intermediate layer is of latex-bond diatomaceous earth is shown in U.S. Pat. No. 3,753,784. According to the researches made by the present inventors, it is found that, if the structure is thus made of three layers holding the layer low in the electrolyte absorbing force (here, the latex-bond diatomaceous earth layer) with the layers of glass paper in the form of a sandwich and the glass paper layers are made to contact both positive and negative plates, the difference in the electrolyte absorbing force between the outer layer and intermediate layer will be so large that the electrolyte will dry out in the intermediate layer. When the separator is thus formed of three or more layers, the manufacture of the battery will be complicated and, as a result, the obtained battery will be expensive.

SUMMARY OF THE INVENTION

A first object of the present invention is to provide a maintenance-free type sealed lead-acid battery wherein a combined separator of a double layer is used, the manufacturing process is simple and the price is low.

A second object of the present invention is to provide a maintenance-free type sealed lead-acid battery wherein combined separator of a double layer which will not dry out even in the overcharging operation in the end of charge the battery is used so that the gas absorbing rate may be very high.

A third object of the present invention is to provide a maintenance-free type sealed lead-acid battery wherein the active substance will not drop and the life will be very long.

A further object of the present invention is to provide a maintenance-free type sealed lead-acid battery wherein a combined separator of a double layer high in the electrolyte absorbing force is used and an electrolyte to which a viscosity increasing agent is added is poured so that the electrolyte may not leak out of the battery.

A fifth object of the present invention is to provide a maintenance-free type sealed lead-acid battery wherein, even with vibration, the active substance will not drop and the electrolyte will not leak out.

The maintenance-free type sealed lead-acid battery according to the present invention has a combined separator of a double layer made by laminating in two layers a sheet-shaped separator formed by entangling glass fibers of a diameter not larger than 1 micron as a base with glass fibers of a diameter not smaller than 5 microns or preferably of 10 to 30 microns and a porous member formed of glass fibers of a diameter not smaller than 10 microns or preferably of 19 microns and having a maximum pore diameter larger than of the sheet-shaped separator and the electrolyte consists of an aqueous solution of sulfuric acid in which 0.1 to 5% by weight of a viscosity increasing agent is present.

Further, the maintenance-free type sealed lead-acid battery according to the present invention has a combined separator of a double layer made by laminating on each other a sheet-shaped separator formed by entangling glass fibers of a diameter not larger than 1 micron as a base with glass fibers of a diameter not smaller than 5 microns or preferably of 10 to 30 microns and having a thickness variation rate not smaller than 15% when the measured load is varied from 10 kg/dm$^2$ to 50 kg/dm$^2$ and a porous member having a thickness variation rate not larger than 10% under the same condition and the sheet-shaped separator is made to contact at least one of both positive and negative plates.

DETAILED DESCRIPTION OF THE PREFERRED EMBODIMENTS

Figure 1:
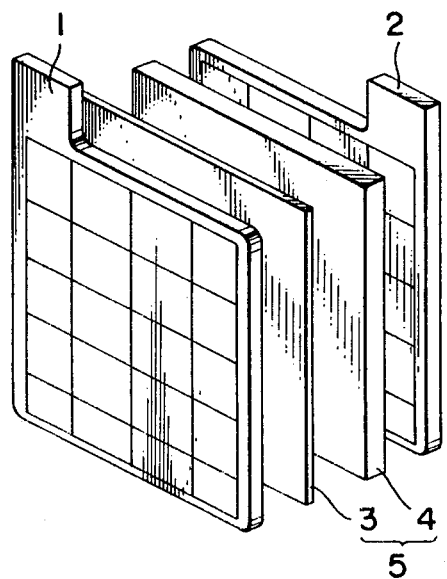
FIG. 1 is a perspective view of battery elements according to one embodiment of the present invention.

FIG. 1 shows a positive plate, negative plate and structure between both plates. 1 is a positive plate. 2 is a negative plate. A combined separator 5 consisting of a sheet-shaped separator 3 and a porous number 4 is inserted between both plates. This embodiment shall be detailed in the following.

Test 1

A combined separator of a thickness of 0.25 mm consisting of 60% of glass fibers of a diameter of 0.75 micron, 30% of glass fibers of a diameter of 3 microns and 10% of glass fibers of a diameter of 11 microns was used for the sheet-shaped separator, a glass mat of a thickness of 1.2 mm consisting of glass fibers of an average diameter of 19 microns was used for the porous member, a dilute sulfuric acid of a specific gravity of 1.30° to 20° C. in an amount to fill 90% of the total pore volume of both plates and combined separator was poured in and a silica powder in a weight varied in the range of 0.1 to 7% on the electrolyte was added to make a sealed lead-acid battery. The results of comparing the capacities of this battery and a battery of the same kind to which no silica was added when they were charged and discharged initially several times are shown in Table 1.

TABLE 1

| Silica content (in %) | Discharging capacity (in amper-hours) | | |
|---|---|---|---|
| | First cycle | Third cycle | Fifth cycle |
| 0 | 4.2 | 3.8 | 3.2 |
| 0.1 | 4.6 | 4.5 | 4.4 |
| 0.5 | 5.0 | 5.2 | 5.1 |
| 1.0 | 5.3 | 5.2 | 5.2 |
| 2.0 | 5.3 | 5.4 | 5.4 |
| 3.0 | 4.9 | 5.0 | 4.9 |
| 5.0 | 4.5 | 4.3 | 4.3 |
| 7.0 | 3.8 | 3.7 | 3.7 |

By the way, the discharging capacity when discharged at a rate of 5 hours is shown.

As evident from Table 1, it is found that, if no silica is added to the electrolyte, the capacity will gradually reduce. When 7% silica is added, the electrolyte will become colloid and therefore the initial capacity will be hard to develop. Therefore, the added amount of silica is proper within the range of 0.1 to 5% in which the initial capacity will be easy to develop and the capacity in the later cycle will not reduce. Particularly the addition of 0.5 to 2% is preferable.

Test 2

A combined separator of a thickness of 0.25 mm of glass fibers consisting of 40% of fibers of a diameter of 0.5 micron, 25% of fibers of a diameter of 13 microns was used for the sheet-shaped separator and a glass mat of a maximum pore diameter of 250 microns and thickness of 1.25 mm made of glass fibers of a diameter of 15 microns was used for the porous member to make a battery.

Also only the sheet-shaped separators or porous members were laminated to be 1.5 mm thick for the separator to make another battery. When the vibration tests were made at an acceleration of 15 G for 2 hours and the life cycles were measured in the alternate charging and discharging tests at a rate of 2 hours, the test results in Table 2, were obtained.

TABLE 2

| Separator | Silica content (in % by weight) | Vibration test | Life cycle (cycle numbers) |
|---|---|---|---|
| Only the sheet-shaped separators | 0 | The positive active substance dropped | 283 |
| Only the sheet-shaped separators | 1 | The positive active substance dropped | 195 |
| Only the porous members | 1 | The electrolyte blew out | 74 |
| The sheet-shaped separator and porous member | 0 | No abnormality | 45 |
| The sheet-shaped separator and porous member | 1 | No abnormality | 299 |
| The sheet-shaped separator and porous member | 2 | No abnormality | 322 |

As evident from Table 2, in the case of only the sheet-shaped separators, that is, the fine fibers, as the elasticity of the fibers is small, the life cycle will be favorable but the vibration-proofness will be weak. This can not be improved even by the addition of silica. On the other hand, in the case of the separator of only the porous members, as the pore diameter is large, the life will be short, the electrolyte retaining property will be low and the vibration will not be endured. Further, even if the sheet-shaped separator and porous member are both used, unless silica is added, the electrolyte will not be distributed well and therefore, though the vibration proofness is high, the capacity will quickly reduce and the life will be short. Here, as in the present invention, only when both of the sheet-shaped separator and porous member are used and silica in such amount as will not make the electrolyte collid is added, it will be possible to satisfy the characteristics of both.

The sheet-shaped separator 3 of the present invention has glass fibers of a diameter not larger than 1 micron as a base but, with only such fine fibers, the mechanical strength as of a separator is insufficient and therefore it is preferable to mix thick glass fibers of a diameter not smaller than 5 microns or, as required, of 10 to 30 microns. In some case, in order to bond the glass fibers with each other, a small amount of organic fibers or a binder having a bonding force may be added. Particularly, in case a mechanical strength is required, comparatively long fibers, for example, about 1 cm long may be mixed in.

The porous member 4 of the present invention having glass fibers of a diameter not smaller than 10 microns or preferably of 19 microns as a base and having a thickness not smaller than 1.0 mm in optimum to obtain a sealed lead-acid battery proof against vibration. As such glass mat has a maximum pore diameter larger than of the sheet-shaped separator, silica must be always added to the electrolyte. When the thickness of the porous member is smaller than 1.0 mm, the elasticity as of a separator will be lost and the vibration-proofness of the battery will remarkably reduce.

In the manner of arranging the sheet-shaped separator 3 and porous member 4 between the plates, the sheet-shaped separator 3 is shown as arranged on the positive plate 1 in the drawing but is not limited to this manner and may be in contact with the negative plate.

The silica to be added to the electrolyte and of a specific surface area not smaller than 200 m²/g and average granule diameter not larger than of 30 millimicrons has a higher effect with a smaller amount of addition and is therefore preferable. It may be added as a solid powder into the electrolyte or such powder may be dispersed in water in advance and may be added as a solution into the electrolyte. It is also possible to mix powdery silica in advance into the combined separator 5. Further, such viscosity increasing agent other than silica as an oxide of aluminum, titanium or magnesium can be used. Such oxide alone or a mixture of a plurality of them can be used.

Further, in order to improve the performance of the battery, such additive as an oxide or sulfate of aluminum or sodium may be made to coexist.

As regards the above amount of addition, if such large amount of silica as, for example, not less than 7% is added as in a so-called gel type battery already used in practice, the capacity will reduce and the practical use will be obstructed. Therefore, it is necessary to limit the amount of addition to be so small as to be not larger than a maximum of 5% or particularly in a range of 0.5 to 2%.

Now, a maintenance-free type sealed lead-acid battery using a porous member in which the thickness variation rate when the measured load is varied from 10 kg/dm² to 50 kg/dm² is lower than 10% and a sheet-shaped separator in which the thickness variation rate under the same condition is higher than 15% shall be described with reference to an embodiment. By the way, the variation rate so called here is calculated by the following formula (1):

$$R = \frac{T_{10} - T_{50}}{T_{10}} \times 100 \, (\%) \tag{1}$$

wherein

R: Thickness variation rate $T_{10}$: Thickness as measured under a load of 10 kg/dm²

$T_{50}$: Thickness as measured under a load of 50 kg/dm²

Figure 2:
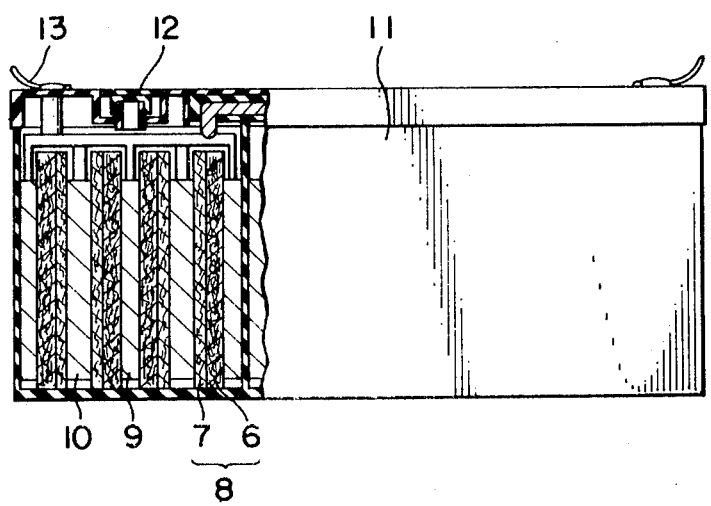
FIG. 2 is a partly sectioned elevation of a battery according to another embodiment of the present invention.

The present invention shall be explained with reference to FIG. 2 showing an embodiment. 6 is a porous member of a thickness variation rate of 6% obtained by dispersing in water 70% by weight of a linter pulp, 10% by weight of acrylic fibers, 15% by weight of glass fibers and 5% by weight of a silica powder of a granule diameter of 0.1 micron to be made paper. 7 is a sheet-shaped separator of a thickness variation rate of 28% at a rate of 80% by weight of glass fibers of a diameter of 0.75 micron and 20% by weight of glass fibers of a diameter of 11 microns. A combined separator 8 is formed of the above mentioned porous member 6 and sheet-shaped separator 7. 9 is a negative plate. 10 is a positive plate. They are laminated so that the negative plate 9 may be in contact with the porous member 6 and the positive plate may be in contact with the sheet-shaped separator 7. The combined separator 8 and negative and positive plates 9 and 10 are impregnated with an electrolyte consisting of sulfuric acid. The assembled element consisting of the combined separators 8 and negative and positive plates 9 and 10 formed as in the above is housed in a battery container 11. 12 is a safety valve. 13 is a terminal.

Figure 3:
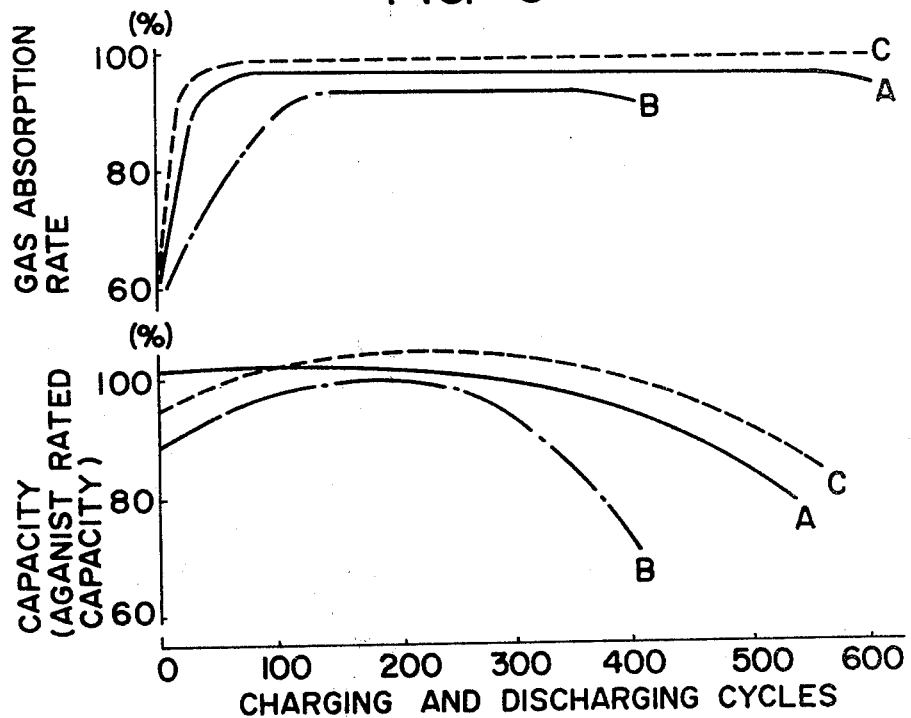
FIGS. 3 and 4 are characteristic curve diagrams showing the variations of the gas absorbing rate and capacity for the charging and discharging cycles of sealed lead-acid batteries according to the not according to the present invention.

Such sealed lead-acid battery A according to the present invention as in FIG. 2, a conventional sealed lead-acid battery B in which the electrolyte was made to gel to be nonfluid by adding 8.5% silica and a sealed lead-acid battery C in which a separator formed of glass fibers of a fiber diameter of 0.5 micron was arranged between the negative and positive plates were provided to test the discharge for 2 hours with a current of ⅓ the rated capacity and the charge for 4 hours with a current of 1/5 the rated capacity and the variations of the gas absorbing rate and capacity with the charging and discharging cycles were measured. The results are shown in FIG. 3. By the way, the gas absorbing rate so called here is a value in % obtained by subtracting the actually reduced weight $W_2$ of the battery from the theoretical water electrolysis amount $W_1$ corresponding to the overcharged electric amount (= the charged electric amount—discharged electric amount) and dividing the balance with the theoretical water electrolysis amount and is represented by the formula (2):

$$G = \frac{W_1 - W_2}{W_1} \times 100 \, (\%) \tag{2}$$

Figure 4:
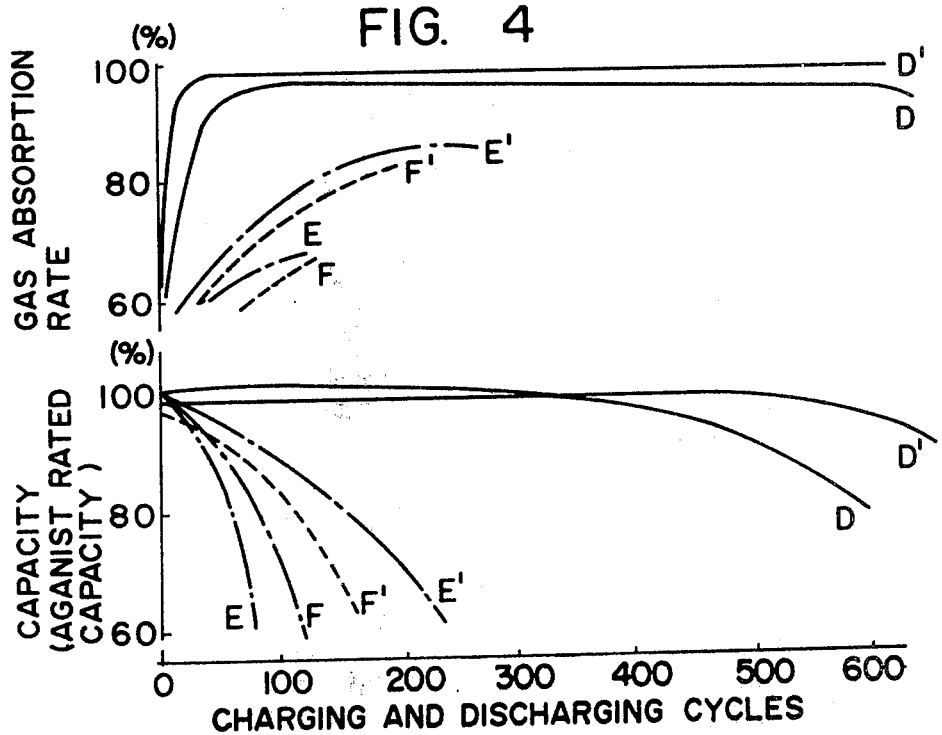

Further, a sealed battery D according to the present invention in which a resin impregnated paper separator of a thickness variation rate of 0.5%, tensile strength of 0.7 kg/mm² and a water permeation amount of 25 cc/min per 16 cm² when pressed under 15 mm H₂O Δ p was used for the porous member and the other formation was made the same as of such sealed battery as is shown in FIG. 2, a sealed battery E not according to the present invention in which glass fibers of a thickness variation rate of 35% and a fiber diameter of 19 microns were used for the porous member and the other formation was made the same as of the sealed battery shown in FIG. 2, a sealed battery F not according to the present invention in which a sheet-shaped separator of 60% by weight of glass fibers of a fiber diameter of 0.75 micron, 30% by weight of a linter pulp, 10% by weight of glass fibers of a fiber diameter of 11 microns and a thickness variation rate of 13% was used for the sheet-shaped separator, a resin impregnated paper separator of thickness variation rate of 0.5% was used for the porous member, both formed a combined separator and the other formation was made the same as of the sealed battery shown in FIG. 2 and sealed batteries D', E' and F' made respectively by containing 0.5% by weight fine powdery silica in the electrolytes of these sealed batteries were provided to make the same tests as are mentioned above and the variations of the gas absorbing rate and capacity with the charging and discharging cycles were measured. The results are shown in FIG. 4. Here, the batteries D, D' and E' were according to the present invention and the batteries E, F and F' were not according to the present invention.

It is found from such test results as in the above and other test results that, though the thickness variation rate is correlated with the elasticity of the material, if the thickness variation rate of the sheet-shaped separator is lower than 15%, the performance will become very low as shown in the sealed lead-acid battery F not according to the present invention and, when it is made higher than 15%, each of the glass fibers of a diameter not larger than 1 micron which are main glass fibers forming the sheet-shaped separator will elastically contact the active substance and such characteristics as its high active substance retaining property and electrolyte absorbency will be able to be utilized.

In order to utilize these characteristics, the sheet-shaped separator is in contact with at least one of the negative and positive plates, will have a thickness of at least 0.1 mm when a load of 10 kg/dm$^2$ is applied and preferably has an area equal to or larger than that of the porous member to prevent the side shorting of the plate of the battery. As the sheet-shaped separator is flexible, even if it has a width larger than of the container, it will be easy to insert the assembled element. If the thickness when a load of 10 kg/dm$^2$ is applied is smaller than 0.1 mm, not only its active substance retaining function will reduce but also an internal shorting will be caused. Further, in order to prevent the shorting in the lower part of the plate, the sheet-shaped separator can be bent to be U-shaped so as to hold the positive plate. What is important is to laminate the sheet-shaped separator and porous member into a double layer of two layers so that the electrolyte between the positive plate and negative plate may not dry out and both plates may not be insulated. With such formation, the above described drying out will be able to be prevented.

The thickness variation rate of the porous member must be lower than 10%. If it is higher than 10%, in case the porous member is combined with the sheet-shaped separator having a thickness variation rate not lower than 15%, the porous member will be deformed by the expansion of the plate, the stacking pressure will be reduced and it will be difficult to laminate them. When the thickness variation rate of the porous member is made lower than 10% as in the present invention, the sheet-shaped separator will be able to be uniformly pressed against the plate, will be able to be fastened with a sufficient pressure against the expansion of the plate caused by the charge and discharge, the stacking pressure will not be reduced and a sealed lead-acid battery of a long service life will be able to be obtained. Further, when such porous member as in the above is used, it will be easy to laminate with the sheet-shaped separator, the physical strength will also improve, the method of assembling the plate group of the conventional lead-acid battery will be able to be adopted as it is, the amount of use of the sheet-shaped separators will reduce and a battery low in the price and high in the performance will be able to be provided.

Maximum pore diameter and average pore diameter of the porous member are not more than 5 times as large as in the sheet-shaped separator. With a maximum pore diameter not larger than 100 microns, the electrolyte will be hard to dry out within the combined separator and therefore it is preferable. Also, as the sheet-shaped separator has a sufficient antioxidizability, such antioxidizability as has been required of a separator is not necessary for the porous member. However, the higher, the better the antioxidizability. Not only the conventional resin impregnated paper separator but also a cellulose sheet in which a phenol resin strengthening it in a range in which the thickness variation rate does not exceed 10% is entirely eliminated or its amount is reduced to reduce the internal resistance of the battery can be used.

In the sealed lead-acid battery according to the present invention, by containing a viscosity increasing agent in the electrolyte, as shown in FIG. 4, the amount of reduction of the electrolyte until the gas absorption is started can be reduced and yet the gas absorption rate itself can be improved, because, by the addition of the viscosity increasing agent, the apparent viscosity of the electrolyte is elevated and the drying out and leaking out of the electrolyte are inhibited. It is proper that the amount of addition of the viscosity increasing agent to the electrolyte is 0.01 to 6% by weight. That is to say, if the amount of addition is less than 0.01% by weight, such effect will never be expected and, if it is more than 6% by weight, not only it will be difficult to pour in the electrolyte but also, as in a so-called gel type battery using a gelling electrolyte, the initial capacity will be hard to develop, the internal resistance of the battery will unnecessarily increase and the discharging voltage characteristic of the battery will deteriorate. In the case of the embodiments in FIGS. 3 and 4, the minimum required amount of addition of silica is 0.5%. This is because, as the porous member used in both embodiments is a glass mat using glass fibers of a diameter of 19 microns, the pore diameter is large. In such case that the thickness variation rate of the porous member is not more than 10% and the maximum pore diameter is not more than 5 times as large as of the sheet-shaped separator, the minimum required amount of addition of silica to the electrolyte is 0.01% by weight. Further, in case a cellulose sheet using no phenol resin at all is used for the porous member, it will be more preferable to add silica to the electrolyte, because the physical strength and antioxidizability of the cellulose sheet itself are so low that it is necessary to elevate the apparent viscosity of the electrolyte and the force of resisting the expansion of the plate.

The viscosity increasing agent particularly having silica as a main component is optimum. The agent consisting of an oxide of not only silicon but also such metal as alminum, titanium or magnesium can be used. By the way, the viscosity increasing agent to be used in the form of a powder of a specific surface area larger than 200 m$^2$/g and average granule diameter smaller than 30 millimicrons develops a remarkable effect with a small amount of addition and is therefore more preferable. By the way, as a method of adding the viscosity increasing agent to the electrolyte, it may be added directly to the electrolyte before being poured in or may be added at the time of putting the assembled element into the battery container after arranging a fixed amount of silica in the assembled element part. The sheet-shaped separator formed by using no binder will not contaminate the negative plate and is therefore more preferable.

As described above, the sealed lead-acid battery of the present invention is high in the gas absorbing performance and life performance, is yet much cheaper than the conventional battery of this kind and is high in the industrial value.

We claim:

1. A vibration resistant, sealed, lead-acid battery comprising:
   a separator element composed of at least two laminated layers, one of said layers comprising a separator sheet formed of an entanglement of a first batch of glass fibers having a diameter not larger than 1 micron and a second batch of glass fibers having a diameter not smaller than 5 microns and the other of said layers comprising a porous member formed of glass fibers having a diameter not smaller than 10 microns, said porous member having a maximum pore diameter that is greater than the maximum pore diameter of the separator sheet; and an electrolyte composed of an aqueous solution of sulfuric acid containing a sufficient amount of a viscosity increasing agent to stabilize the discharge capacity of the battery without reducing the initial discharge capacity.

2. A battery as set forth in claim 1 wherein said agent is present in said solution in an amount of from 0.1 to 5 weight percent.

3. A battery as set forth in claim 2 wherein said agent is selected from the group consisting of oxides of silicon, aluminum, titanium and magnesium.

4. A battery as set forth in claim 2 or claim 3 wherein the glass fibers of said second batch thereof have a diameter of 10–30 microns.

5. A battery as set forth in claim 2 or claim 3 wherein the glass fibers of said porous member have a diameter of 19 microns.

6. A battery as set forth in claim 2 or claim 3 wherein said porous member has a thickness of at least 1.0 mm and said agent consists of granules having a specific surface area greater than 200 $m^2/g$ and an average granule diameter not larger than 30 millimicrons.

7. A battery as set forth in claim 2 wherein said separator sheet is binder free.

8. A vibration resistant, sealed, lead-acid battery comprising:

a separator element composed of at least two laminated layers, one of said layers comprising a separator sheet formed of an entanglement of a first batch of glass fibers having a diameter not larger than 1 micron and a second batch of glass fibers having a diameter not smaller than 5 microns and the other of said layers comprising a porous member having a maximum pore diameter that is greater than the maximum pore diameter of the separator sheet, said separator sheet having a thickness variation rate not lower than 15 percent when the applied measured load is varied from 10 $kg/dm^2$ to 50 $kg/dm^2$ and said porous member having a thickness variation rate not greater than 10 percent under the same load conditions, said sheet being disposed in contact with at least one of the plates of the battery; and an electrolyte composed of an aqueous solution of sulfuric acid containing a sufficient amount of a viscosity increasing agent to stabilize the discharge capacity of the battery without reducing the initial discharge capacity thereof.

9. A battery as set forth in claim 8 wherein said agent is present in said solution in an amount of from 0.1 to 6 weight percent.

10. A battery as set forth in claim 8 wherein the glass fibers of said second batch thereof have a diameter of 10–30 microns.

11. A battery as set forth in claim 9 or claim 10 wherein said agent is selected from the group consisting of oxides of silicon, aluminum, titanium and magnesium.

12. A battery as set forth in claim 9 or claim 10 wherein said porous member has a maximum pore diameter not larger than a 100 microns.

13. A battery as set forth in claim 9 or claim 10 wherein said separator sheet is binder free.

14. A battery as set forth in claim 9 wherein said agent consists of granules having a specific surface area greater than 200 $m^2/g$ and an average granule diameter not larger than 30 microns.

15. A battery as set forth in claim 9 wherein said porous member has a pore diameter not more than five times greater than the diameter of the pores of the separator sheet.

16. A battery as set forth in claim 9 wherein said porous member comprises a cellulose sheet which is not impregnated with a phenol-formaldehyde resin.

17. A battery as set forth in claim 9 wherein the area of said separator sheet is at least equal to the area of said porous member.

18. A battery as set forth in claim 9 wherein said separator sheet has a thickness not smaller than 0.1 mm when a load of 10 $kg/dm^2$ is applied thereto.

* * * * *